(12) United States Patent
Zijlman et al.

(10) Patent No.: US 11,743,990 B2
(45) Date of Patent: Aug. 29, 2023

(54) BALANCE CONTROL FOR 2-CHANNEL CCT DIMMING

(71) Applicant: SIGNIFY HOLDING B.V., Eindhoven (NL)

(72) Inventors: Theo Gerrit Zijlman, Tilburg (NL); Eugen Jacob De Mol, Eindhoven (NL); Henricus Marius Joseph Maria Kahlman, Dongen (NL); Zhaomin Meng, Shanghai (CN); Dmytro Viktorovych Malyna, Achel (BE); Marcel Beij, Sint Oedenrode (NL); Franciscus Jacobus Vossen, Helmond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/628,090

(22) PCT Filed: Jul. 16, 2020

(86) PCT No.: PCT/EP2020/070104
§ 371 (c)(1),
(2) Date: Jan. 18, 2022

(87) PCT Pub. No.: WO2021/013677
PCT Pub. Date: Jan. 28, 2021

(65) Prior Publication Data
US 2022/0279636 A1    Sep. 1, 2022

(30) Foreign Application Priority Data
Jul. 19, 2019 (EP) .................................... 19187326

(51) Int. Cl.
*H05B 45/3725* (2020.01)
*H05B 45/34* (2020.01)
(Continued)

(52) U.S. Cl.
CPC ......... *H05B 45/3725* (2020.01); *H05B 45/24* (2020.01); *H05B 45/34* (2020.01); *H05B 47/155* (2020.01)

(58) Field of Classification Search
CPC .... H05B 45/3725; H05B 45/24; H05B 45/34; H05B 47/155; H05B 45/20; H05B 45/325; H05B 45/36
See application file for complete search history.

(56) References Cited

U.S. PATENT DOCUMENTS 7,777,704 B2 *  8/2010  S ............................. H05B 45/38
                                                    345/82
8,786,205 B2 *  7/2014  Zhang .................. H05B 45/327
                                                    315/192

(Continued)

FOREIGN PATENT DOCUMENTS

CN        203104906 U    7/2013
GB         2492833 A     1/2013

*Primary Examiner* — Daniel D Chang

(57) ABSTRACT

The invention relates to a lighting system comprising a load comprising a parallel configuration of a first LED load having a first forward voltage, and a first switch coupled in series with the first LED load; and a second LED load, having a second forward voltage being different than the first forward voltage; a switched mode power supply comprising a switching element; an inductor; a diode; a set of output pins for coupling to the load; and a capacitor coupled across the set of output pins; wherein the switched mode power supply is arranged to provide a voltage across the set of output pins, wherein the lighting system comprises a further inductor coupled between the one of the output pins and the load.

13 Claims, 14 Drawing Sheets

(51) Int. Cl.
*H05B 47/155* (2020.01)
*H05B 45/24* (2020.01)

(56) References Cited

U.S. PATENT DOCUMENTS

| | | |
|---|---|---|
| 9,544,955 B2 | 1/2017 | Huber |
| 2012/0200229 A1* | 8/2012 | Kunst .................. H05B 45/385 315/186 |
| 2013/0313982 A1 | 11/2013 | Reed |
| 2015/0091472 A1* | 4/2015 | Kadotani ........... H05B 45/3725 315/294 |
| 2017/0295618 A1 | 10/2017 | Dann et al. |

* cited by examiner

BALANCE CONTROL FOR 2-CHANNEL CCT DIMMING

CROSS-REFERENCE TO PRIOR APPLICATIONS

This application is the U.S. National Phase application under 35 U.S.C. § 371 of International Application No. PCT/EP2020/070104, filed on Jul. 16, 2020, which claims the benefit of European Patent Application No. 19187326.4, filed on Jul. 19, 2019. These applications are hereby incorporated by reference herein.

FIELD OF THE INVENTION

The invention relates to a lighting system.

BACKGROUND OF THE INVENTION

In connected lamps, i.e. lamps that can be controlled via an external signal such that they can perform different actions such as dimming or color changing, more than one LED string is used. Each string is driven by an independent driver so that the two or more strings can be controlled in an optimized way. This requires additional drivers per added string and is costly.

Another way to drive the LED strings is to provide an AC/DC converter followed by a DC/DC current source. The LED strings are then placed in parallel and each string is controlled with a series switch for achieving the desired light setting such as a color point. This provides more flexibility with the design of the driver when additional LED strings are attached. For an optimal drive without color spread, the length, or at least the forward voltage, of the LED strings should be equal. When there is a voltage spread between the LED strings, the color point shifts because there is an imbalance between the strings since the DC/DC converter generates only one voltage level that is buffered by a large buffer capacitor. This effect is undesired.

SUMMARY OF THE INVENTION

It is an objective of the invention to provide an improved lighting system that provides a cheap solution for reducing the effect of the color shift caused by the energy transfer between the capacitors in parallel with the LED strings.

To overcome this concern, in a first aspect of the invention, there is provided a lighting system comprising:
a load comprising an input for receiving a voltage and the input being coupled to a parallel configuration of:
a first LED load having a first forward voltage, and a first switch coupled in series with the first LED load; and
a second LED load, having a second forward voltage being different than the first forward voltage;
a switched mode power supply comprising:
a switching element;
an inductor;
a diode;
a set of output pins for coupling to the load; and
a capacitor coupled across the set of output pins;
wherein the switched mode power supply is arranged to provide a voltage across the set of output pins, wherein the lighting system comprises a further inductor coupled between one of the output pins and the input of the load.

As an LED load, an LED string can be understood.

A major problem of two LED strings in parallel where at least one of the LED strings is coupled to a series switch is that a voltage step is created across the output capacitor of the switched mode power supply when the first switch opens or closes. This is because the output capacitor is connected at the output of the switched mode power supply and to the LED strings, which have different string voltages. This voltage step causes the current change from one string to another string to occur with a current step, which impacts the light output negatively and causes a color spread. The problem is solved by placing an inductor at the output of the switched mode power converter between the output and the LED loads. This inductor is not susceptible to a sudden voltage change because it allows the switched mode power converter act as a real current source. The capacitive behavior of the switched mode power supply towards the load is reduced or even negated. A sudden change in load voltage does not influence the constant current behavior of the inductor. Therefore, no current step is created that will influence the light output in a negative way.

In a further example of the invention, the load comprises a second switch coupled in series with the second LED load.

This allows an improved control of the LED strings because both LED strings can be controlled independently.

In another example of the invention, the first switch is turned on complementary to the second switch.

Turning the first switch on complementary to the second switch means that at any moment in time at least one switch is on so that a current flow from the driver to the load is always guaranteed.

In another example of the invention, the lighting system comprises only one switched mode power supply.

The lighting system as described is optimized to operate with only one switched mode power supply.

In another example of the invention, the first switch is controlled using pulse width modulation.

Using pulse width modulation for controlling the first switch provides an efficient way for controlling the light output in the first string.

In another example of the invention, the switched mode power supply is arranged to provide a constant current.

In another example of the invention, the switched mode converter is configured as any one of a buck converter, a boost converter, a buck-boost converter, a flyback converter, an LLC converter, a SEPIC converter and a Ćuk converter In another example of the invention, the load comprises a third LED load and a third switch coupled in series with the third LED load.

Providing a third string in parallel to the other load provides more control if a color control needs to be performed. The three strings of LED may then comprise red, green and blue LEDs.

In another example of the invention, a light color of the first LED load, the second LED load and the third LED are different to each other.

In another example, the capacitor is a buffer capacitor for storing energy for driving the load.

The larger the capacitor at the output of the switched mode power supply, the more severe the effect of the current step is. Therefore, with larger capacitances, the parallel inductor provides an even better result than when the capacitor is relatively small.

In another example, the first switch comprises an anti-parallel diode.

An example of a switch comprising an anti-parallel diode is a MOSFET. The MOSFET has a low resistive path when it is turned on and is therefore preferred to be used in the circuit.

In another example, the parallel configuration comprises:

a first diode coupled in series with the first LED load;
a second diode coupled in series with the second LED load;
a first capacitor coupled in parallel with the first LED load; and
a second capacitor coupled in parallel with the second LED load;

Providing capacitors in parallel with the LED loads will reduce the current ripple that will flow through the LED loads. To prevent undesired discharges between the capacitors, additional diodes have to be placed in series with the parallel configurations of the LED loads and the capacitors.

BRIEF DESCRIPTION OF THE DRAWINGS

Examples of the invention will now be described with reference to the accompanying drawings, in which.

DETAILED DESCRIPTION OF THE EMBODIMENTS

Figure 1:
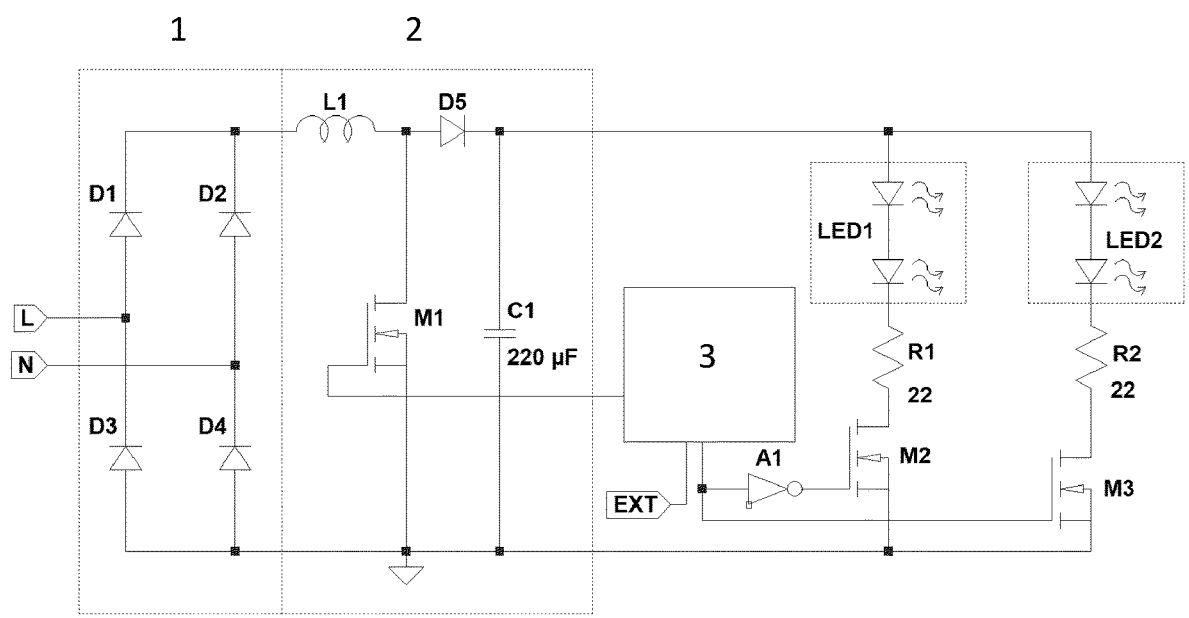
FIG. 1 shows an example of a known lighting system

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

FIG. 1 shows a lighting system as is known in the art. The lighting system has a rectifier circuit for rectifying an AC input voltage into a rectified output voltage. This output voltage is provided to a switched mode power supply that provides a controlled output voltage and/or current. The output of the switched mode power supply is connected to an LED load. The LED load has a first string of LEDs and is coupled in series with a first switch. Another LED load is connected in series with a second switch and the series arrangement is connected in parallel to the first LED load and first switch. In this case, the forward voltage of both LED strings differs from each other. In the case that only the first switch is closed, a current will flow through the first switch and the corresponding LED load. When the second switch closes and the first switch is opened, a current will flow through the second LED load. However, because of the difference in string voltage, the current to the load will change rapidly. In case the forward voltage of the first LED string is higher than the forward voltage of the second string, the second string of LEDs will be powered with a voltage that is too large for the second LED string. This results in an undesired overcurrent through the second LED string. In case the first forward voltage of the first LED string is lower than the forward voltage of the second LED string, the voltage at the output of the switched mode power supply needs to build up before the second LED can start drawing current. This results in a period of time wherein the second LED string remains off, where it should have drawn current.

Both the current increase and the time no current is drawn result in a change in desired output color or color spread.

Figure 2A:
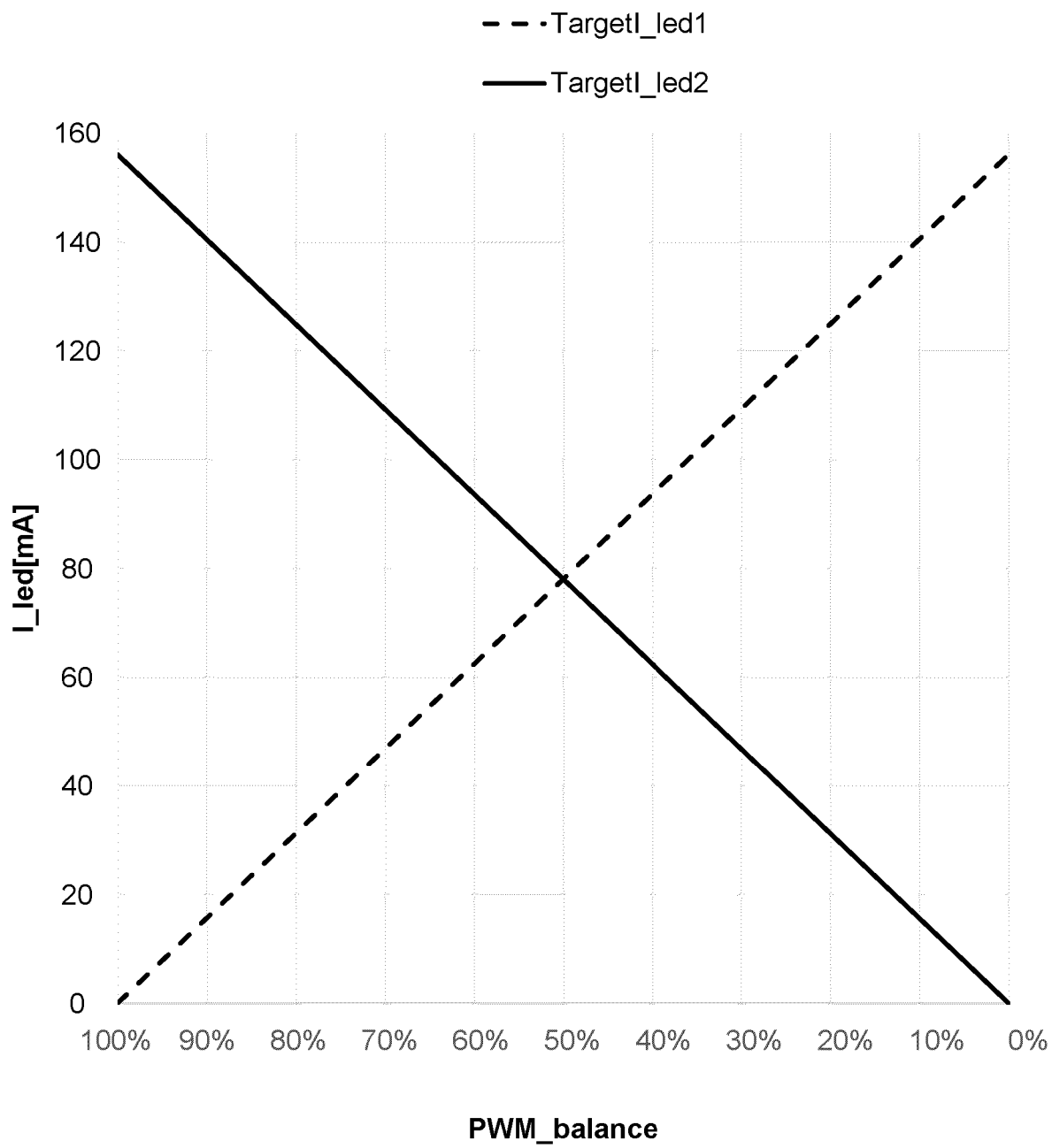
FIGS. 2A-D show graphical representations of color shift.
Figure 2B:
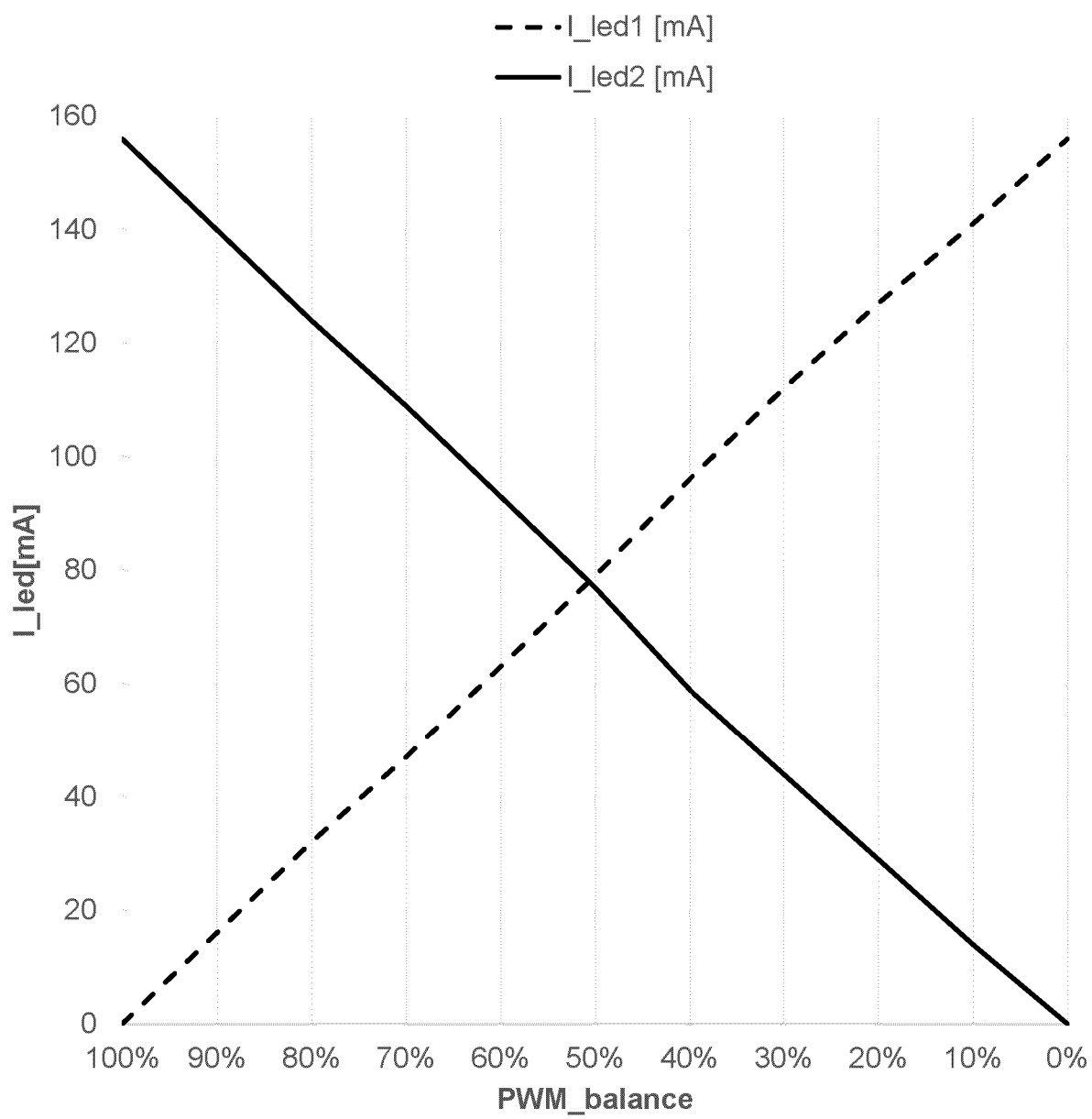

FIG. 2A shows a graph of the desired currents flowing through the first LED string and the second LED string in the situation where the invention is not implemented. In FIG. 2B, the LED currents are shown in the situation that the forward voltage of the first LED string is equal to the forward voltage of the second LED string. The currents through the first and second LED strings follow the desired currents very well.

Figure 2C:
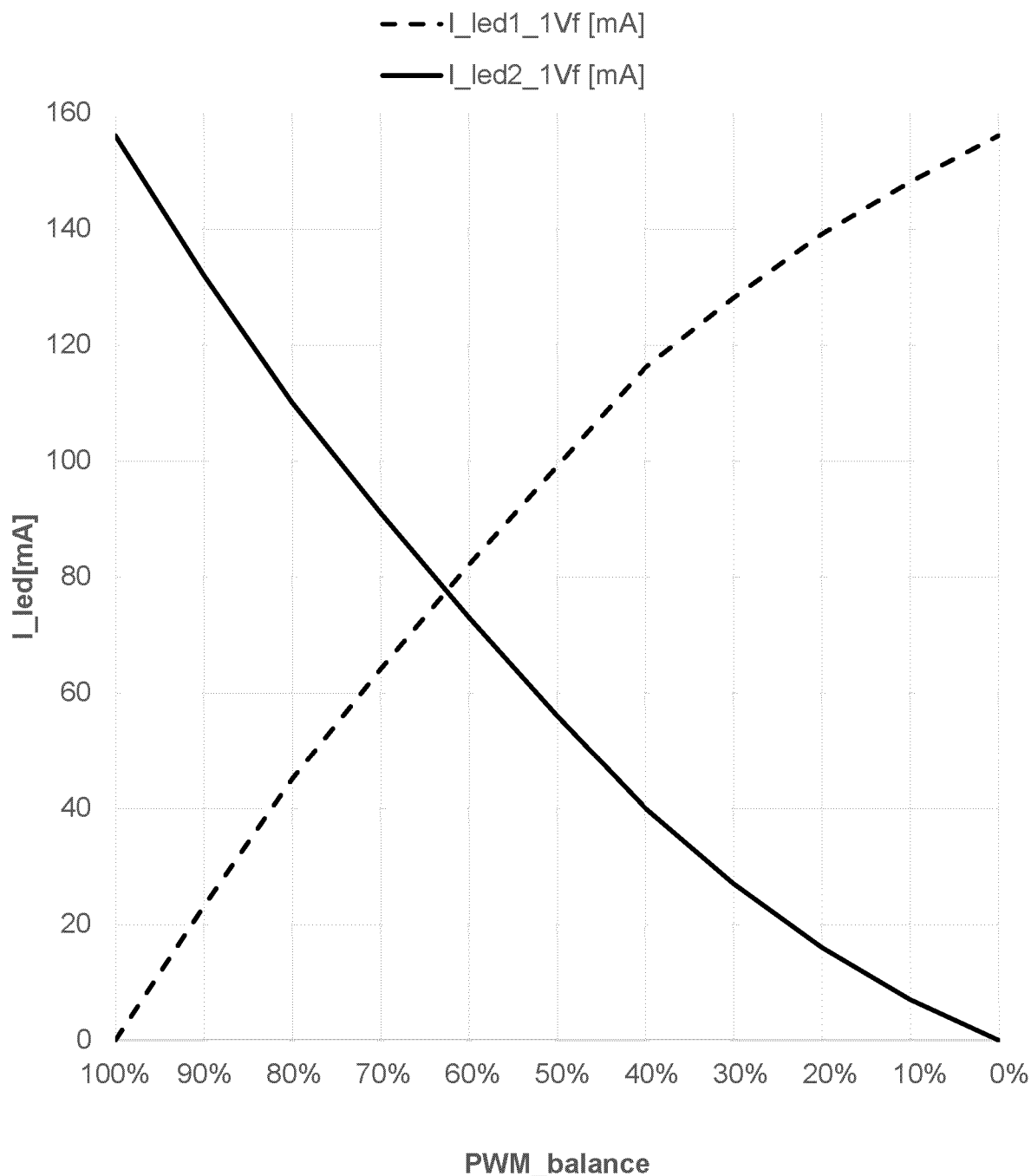
Figure 2D:
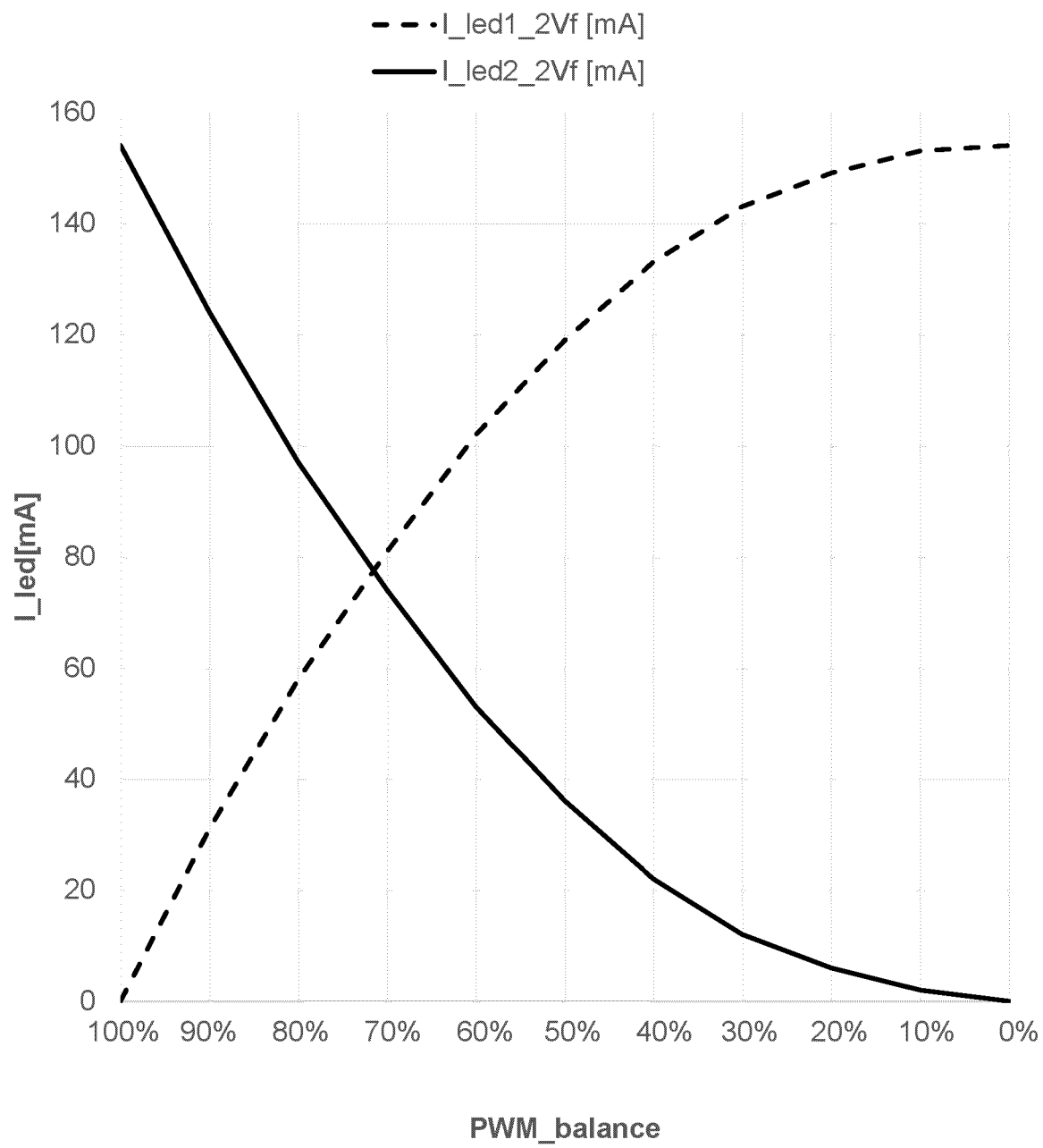

FIGS. 2C and 2D show examples of the first and second LED string currents when the forward voltages are not equal to each other. It can be observed that the current through the first and second LED strings changes with respect to the desired current. This effect is especially noticeable when dimming of the light output is applied. This change of current results in a perceived color shift by the user, which is undesired.

Figure 3:
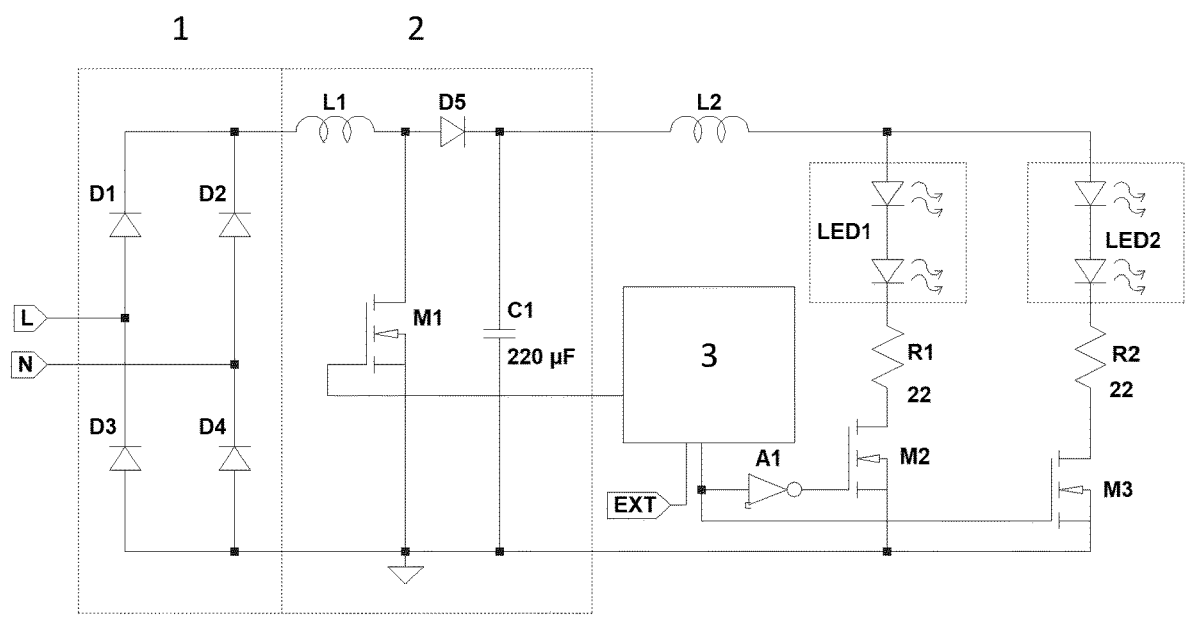
FIG. 3 shows an embodiment of the invention

FIG. 3 shows an example of a lighting system according to the invention. The lighting system has an AC/DC converter 1 in the form of a rectifier bridge with diodes D1, D2, D3 and D4. Via a line L and neutral N wire, an AC voltage is provided to the AC/DC converter. The AC/DC converter provides a rectified voltage at its output. The rectified voltage is provided to a switched mode power supply. In this example, the switched mode power supply is designed as a boost converter 2. The boost converter 2 has an inductor L1, a diode D5, a capacitor C1 and a switch M1. It is to be noted that in this example, a boost converter 2 is used but other topologies can also be used. Other topologies which are commonly known are buck converters, buck-boost converters, flyback converters, LLC (resonant) converters, SEPIC converters and Ćuk converters.

The boost converter 2 can provide a controlled output voltage or output current. In the example provided in FIG. 1, the boost converter 2 provides a constant voltage to its output. The capacitor C1 is used to provide an energy buffer at the output of the boost converter 2 to improve the stability of the voltage at the output of the boost converter 2.

This constant voltage is provided to a load. The load comprises a first LED string LED1 in series with a resistor R1 and a switch M2. In parallel to this series connection of first LED string LED1, resistor R1 and switch M2 is connected a second LED string LED2 in series with a resistor R2 and a second switch M3. The forward voltage of the first LED string LED1 differs from the forward voltage of the second LED string LED2. A controller 3 provides a control signal to the first switch M2 and the second switch M3. In this example, the first switch M2 and second switch M3 are controlled in a complementary way. This means that when the first switch M2 is turned on, the second switch M3 is turned off and vice versa. The controller 3 can also control the first switch M2 independent of the second switch M3 as long as the switches are controlled in a non-overlapping way i.e. both switches cannot be turned on simultaneously.

The second switch M3 can be omitted to provide the simplest control methodology. In order to operate the load correctly, it is required that the first LED string LED1 has a lower voltage than the second LED string LED2. When the first switch M2 is closed, the LED string with the lowest forward voltage will start conducting. In this case, the first LED string LED1 will conduct. When the switch is open, only the second LED string LED2 can conduct, so the LED string with the highest string voltage will then conduct. With one switch it is not possible to turn off both LED strings. This can only be done by turning off the boost converter 2.

The controller 3 can also provide a control signal to the switch M1.

The voltage created by the boost converter 2 needs to be at least as large as the largest forward voltage of the two LED strings in order to be able to provide power to the LED strings. The string with the lowest forward voltage is then at least for a short period of time driven with the same high voltage as the voltage used for driving the string with the higher forward voltage. This causes a short increase in current flowing through the LED string and causes an undesired color spread.

This problem is solved by introducing an inductor L2 in series between the output of the switched mode power supply and the load.

The inductor L2 can have a preferred value of 20 μH but other values are also possible, based on design choices and power requirements.

The inductor L2 provides a current stabilization because the current in the inductor cannot change quickly due to instant voltage changes, which occur if the first switch M2 is turned on or off. Instead, the voltage change over the inductor will cause a current slope to occur, which depends on the inductance value and the amount of voltage drop over the inductor L2.

Even though there is a sudden voltage change at the load side because of switching of any of the switches M2 or M3, the switched mode power supply 2 does not see this voltage change. Instead, only a relatively slow slope in the output current instead of a sudden change in the output current can be observed. If the switched mode power supply is a constant output current supply, the current can be regulated to a fixed amount of current easily because of the slow current variation caused by the inductor L2.

The introduction of the inductor L2 makes control of the output voltage or current so simple that it is preferred to use only one switched mode power 2 supply for providing power to the first LED string LED1 and the second LED string LED2.

The invention as described has two LED loads. More LED loads can be connected in parallel with the other LED loads, together with an additional switch.

The resistors R1 and R2 are used for limiting the current through the LED loads LED1 and LED2. When the switched mode power supply 2 is a constant current source, the resistors can be omitted as the current is limited by the switched mode power supply 2.

The first switch M2 and the second switch M3 can be controlled by the controller 3. The first LED string LED1 and the second LED string LED2 can have different color temperatures. The control of the first switch M2 and the second switch M3 allows control of the overall color temperature created by the lighting system. An external signal can be provided via a user interface such as a remote control, a mobile device or control buttons. A user can therewith select a desired light effect which is used by the controller 3. In this example, also only the first switch M2 can be used to generate the lighting effect.

When three or more parallel LED strings are used, a desired color effect can be created. The controller 3 can then control all three LED strings.

Figure 4A:
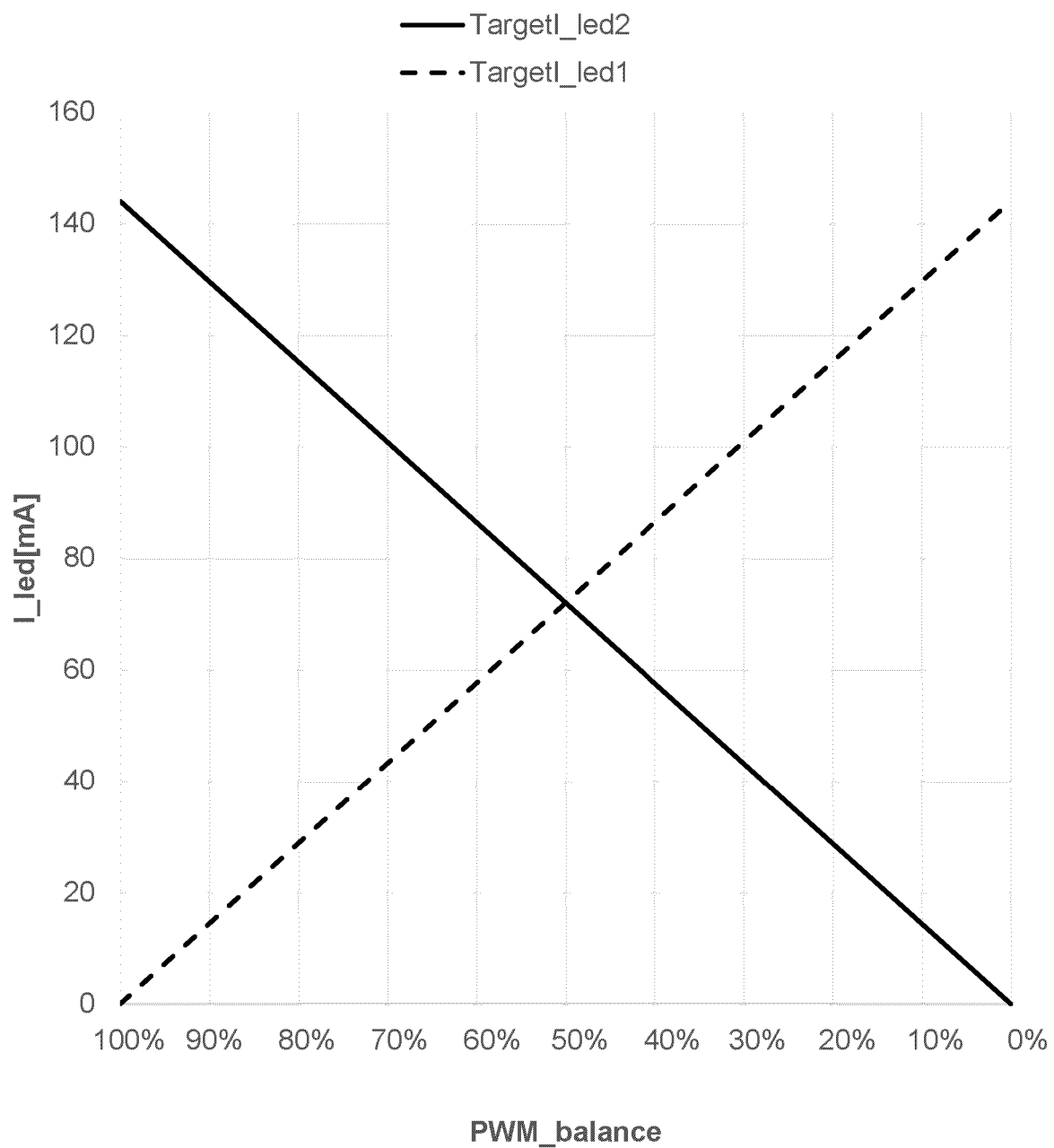
FIGS. 4A-D show graphical representations of the effect of the invention.
Figure 4B:
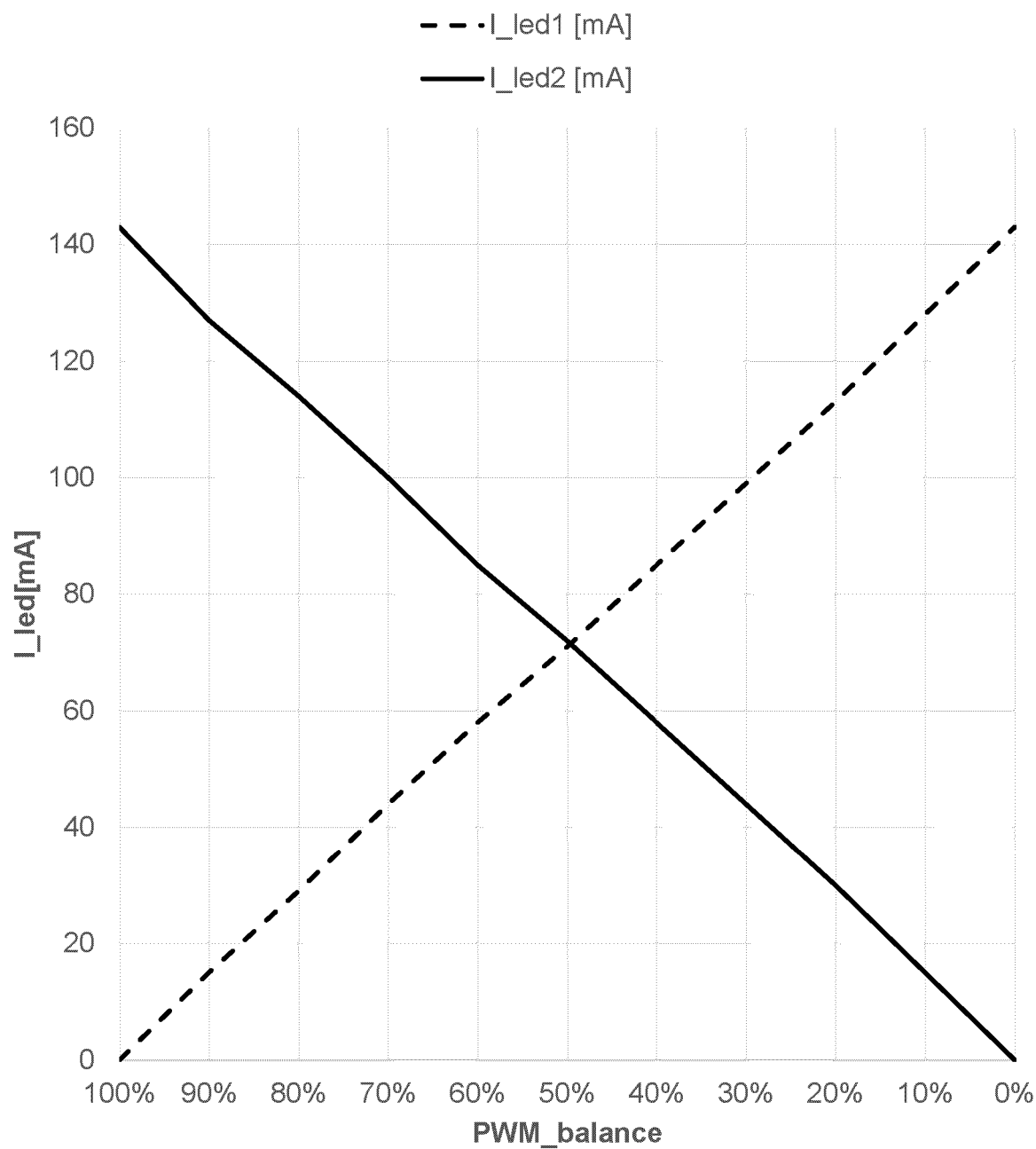

FIG. 4A shows a graph of the desired currents flowing through the first string of LEDs and the second string of LEDs in the situation where the invention is not implemented. In FIG. 4B, the LED currents are shown in the situation that the forward voltage of the first string of LEDs is equal to the forward voltage of the second string of LEDs. The currents through the first and second string of LEDs follow the desired currents very well.

Figure 4C:
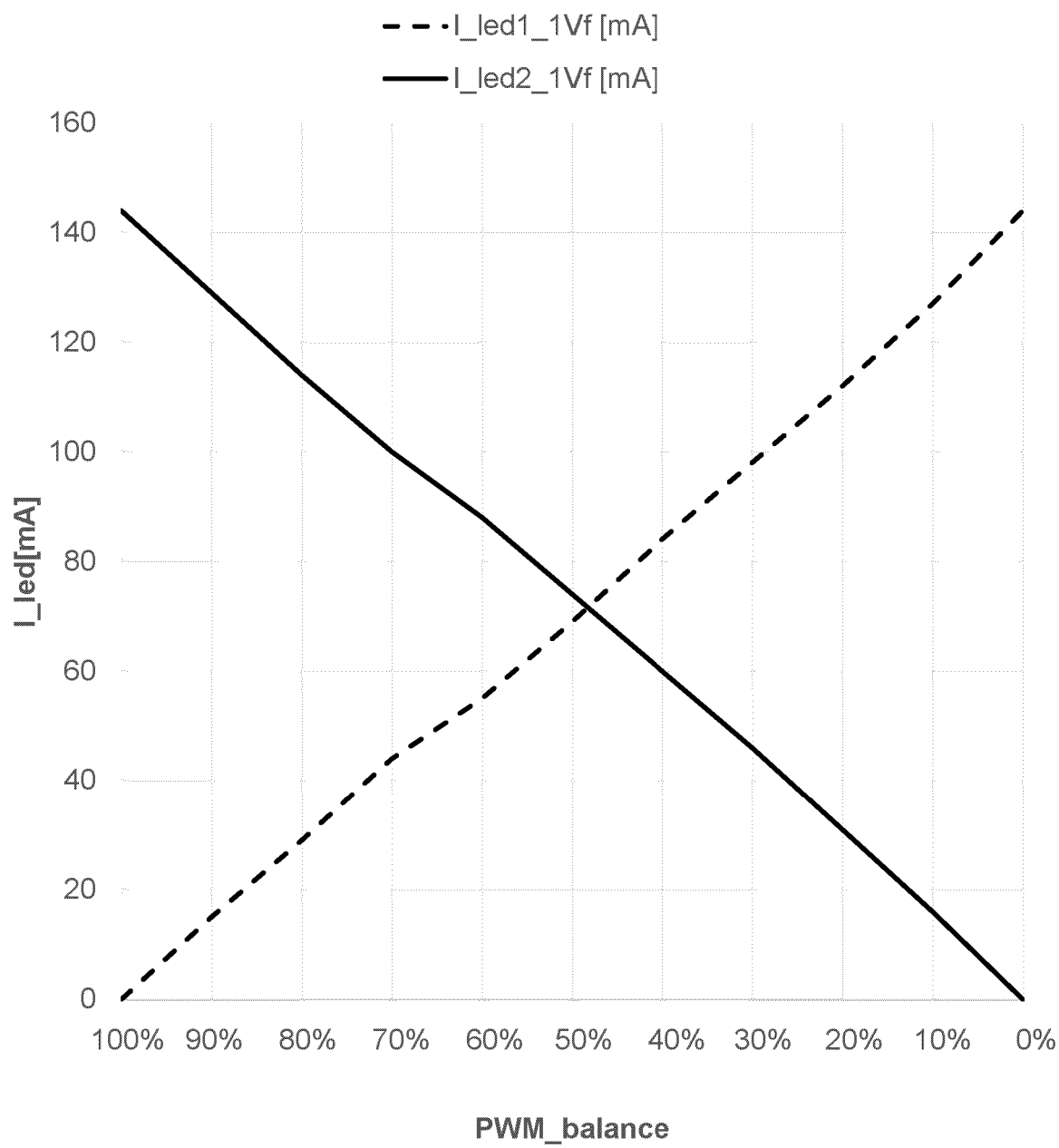
Figure 4D:
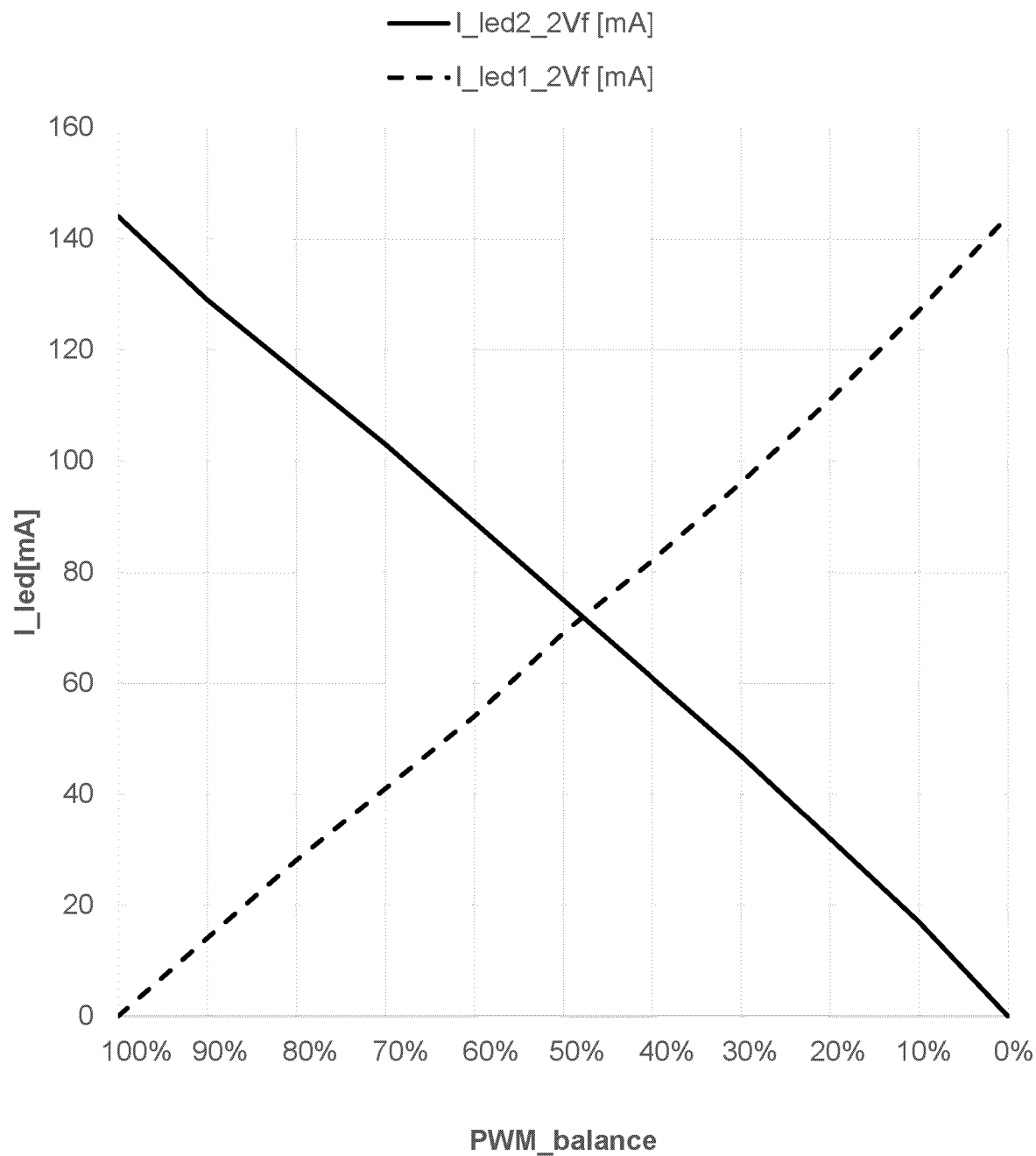

FIGS. 4C and 4D show examples of the first and second LED string currents when the forward voltages are not equal to each other. It can be observed that the current through the first and second string of LEDs remain very close to the desired current levels. Therefore, there is virtually no color shifting.

Figure 5:
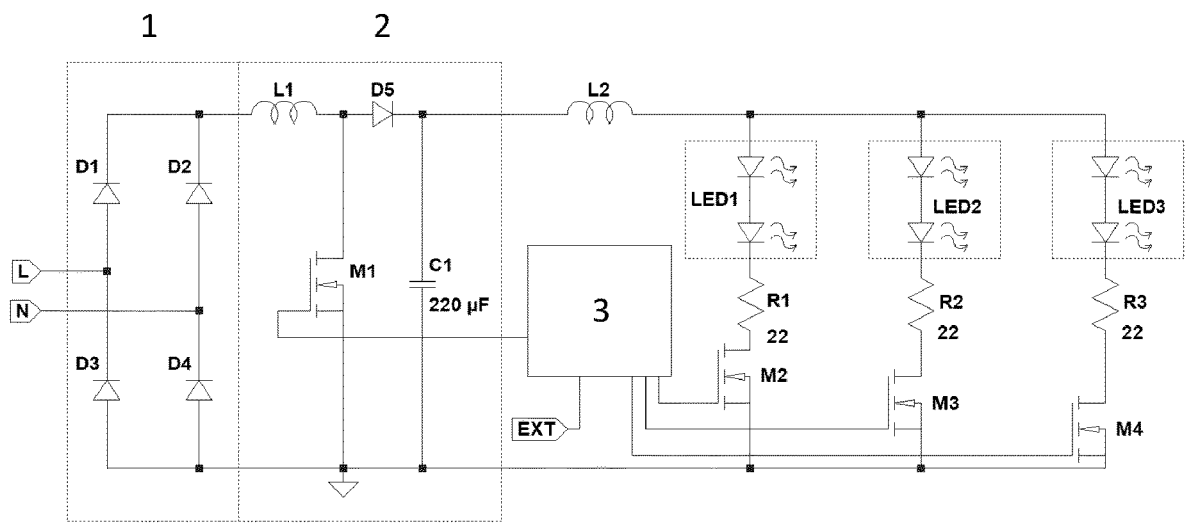
FIG. 5 shows an embodiment of the invention with three LED strings.

FIG. 5 shows an example of a lighting circuit where three LED strings are used to create an improved color mixing. An additional LED string LED3 is coupled in series with an additional switch M3. A series resistor R3 can be added to limit the current if that would be required by the application.

Figure 6:
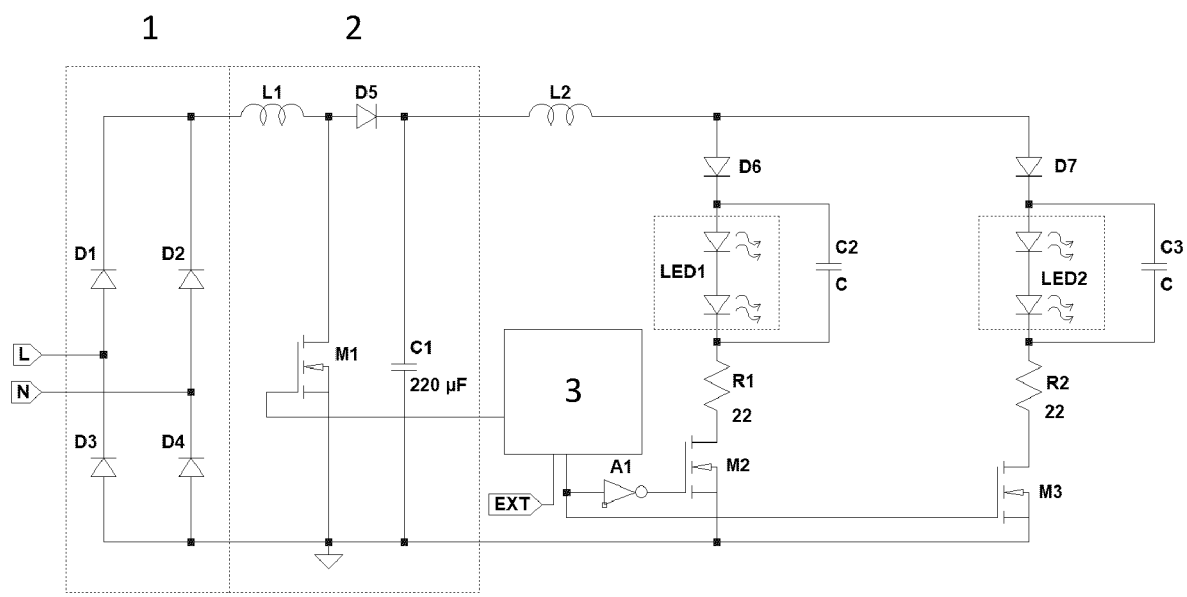
FIG. 6 shows an embodiment of the invention with an improved ripple reduction.

FIG. 6 shows an example of a lighting circuit according to the invention where an additional ripple reduction is achieved.

The main features in FIG. 6 are similar to that of FIG. 3. In parallel to the first LED string LED1, a capacitor C2 is placed. In parallel to the second LED string LED2, a capacitor C3 is placed. These capacitors filter out high frequency components that are present in the current that is provided from the switched mode power supply 2. Because the string voltages of the two LED strings are not equal, one capacitor can discharge into another. The capacitor connected to the LED string with the highest string voltage will discharge in the capacitor connected to the LED string with a lower string voltage upon switching from the LED string with the high forward voltage to the LED string with the low forward voltage. To prevent this from happening, diodes are placed in series with the parallel configuration of the LED loads and corresponding capacitors. A first diode D6 is coupled in series with the parallel combination of the first LED load LED1 and the first capacitor C2. A second diode D7 is coupled in series with the parallel combination of the second LED load LED2 and the second capacitor C3.

Figure 7:
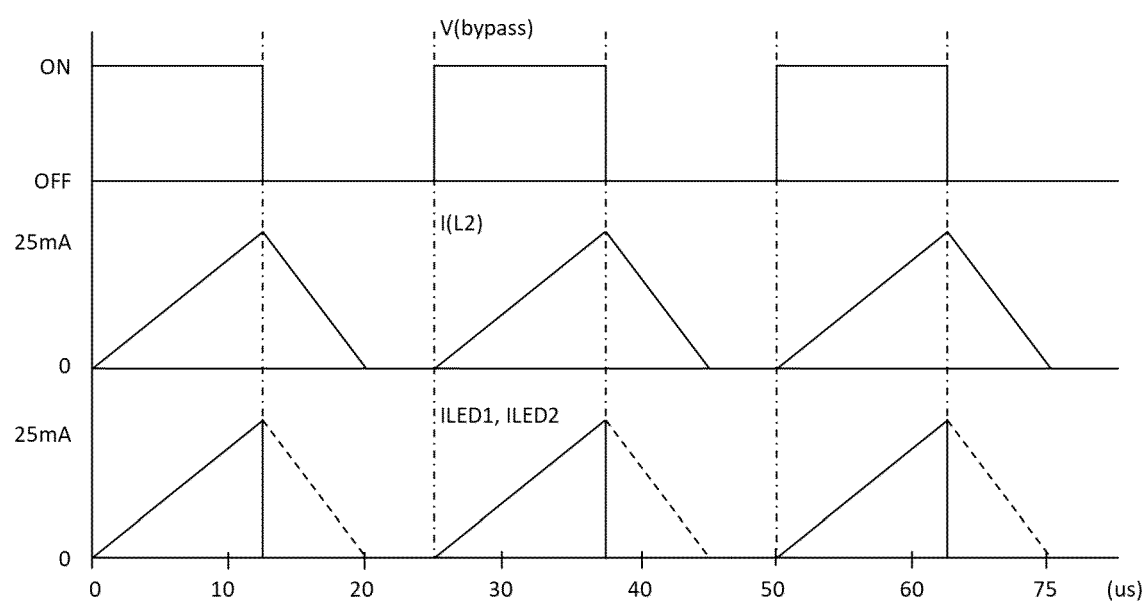
FIG. 7 shows an example of an operation of a lighting system in discontinuous mode.

FIG. 7 shows an exemplary operating mode wherein the current through the inductor L2 is not flowing continuously. This is caused by the boost converter because the boost converter is operated such that the current through the inductor L2 is discontinuous. This can be done when the load is dimmed down so that a very low power is needed. Alternatively, the inductance of the inductor L2 can be chosen smaller such that the current through the inductor L2 becomes discontinuous. The control signal of switch M2 $V_{bypass}$ is shown in the top graph of FIG. 7. This control signal is inverted and provided to the switch M3. In this example, it is assumed that the first LED string LED1 has a forward voltage that is lower than the forward voltage of the second LED string LED2. The LED string voltage is present at the right side of the inductor L2. The voltage on the left side is based on the total amount of power provided by the switched mode power supply 2. As the switched mode power supply 2 provides a constant current, the voltage at the left side of the inductor L2 is equal to the total provided power divided by the current provided by the switched mode power supply 2. This voltage level is located in between the forward voltage levels of the first and second LED strings. When the first LED string LED1 is turned on, a positive voltage is present over the inductor L2 resulting in an increasing current, i.e. a positive di/dt, through the inductor L2. When the second LED string LED2 is turned on, a negative voltage will be present across the inductor L2, resulting in a decreasing current, i.e. a negative di/dt, through the inductor L2. The current through the inductor L2 is shown in the middle graph, showing the current IL2. In the example provided in FIG. 7, a fifty/fifty relation between the first LED string LED1 and second LED string LED2 light output is desired. However, because of the discontinuous current through the inductor L2, this relationship is disturbed because the first LED string LED1 emits more light than the second LED string LED2. In the bottom graph, the continuous line represents the current ILED1, which is the current flowing through the first LED string LED1. The dashed line represents the current ILED2, which is the current flowing through the second LED string LED2.

Figure 8:
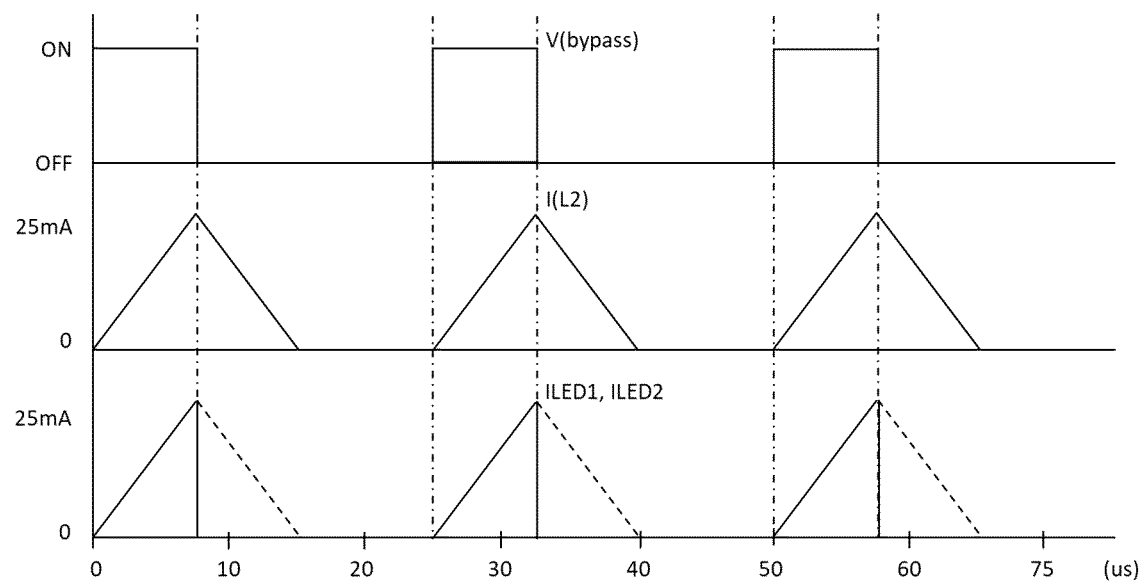
FIG. 8 shows an example of an embodiment of the invention where a compensation is done for operating in the discontinuous mode.

FIG. 8 shows how the relation of the light output between the first LED string LED1 and the second LED string 2 can be corrected for. Similar to FIG. 7, the control signal of switch M2 Vbypass is shown in the top graph. The duty cycle of the switch M2 is lowered. This results in a shorter time the current can build up in the inductor L2. This also results in more time that the current through the inductor L2 is zero because the current returns to zero earlier in time. This allows the voltage on the left side of inductor L2 to build up over capacitor C1 because the current provided from the switched mode power supply now only flows through the capacitor C1 instead through inductor L2. Because of the increase of this voltage, the positive di/dt will also be higher due to the equation of $$V = L\frac{di}{dt},$$

where V is the voltage over an inductor, L is the inductance of the inductor and the di/dt is the change of current over time. The reduction of the duty cycle of the switch M2 results in a reduction of average current flowing through the first LED string LED1. In the example provided, the duty cycle of the switch M3 is the inverse of the duty cycle of the switch M2. Similar as in FIG. 7, the middle graph represents the current through the inductor L2. In the bottom graph, the continuous line represents the current ILED1, which is the current flowing through the first LED string LED1. The dashed line represents the current ILED2, which is the current flowing through the second LED string LED2. The control of the duty cycle of switch M2 therefore also controls the current flowing through the second LED string LED 2. A correction could be done by measuring the current flowing through the first LED string LED1 and the second LED string LED2 either by sensing the total amount of current flowing through inductor L2 or each individual current of the first and second LED strings. The current flowing through the first LED string LED1 can be compared with the current flowing through the second LED string LED2. The error between these currents can be used by the controller 3 to control the duty cycle of the switch M2 such that the error is reduced.

In this example a fifty/fifty relation is desired. It is however clear that other relations might also be used such as, but not limited to, a 30/70 or a 20/80 relation.

In the examples provided, the first LED string LED1 and the second LED string LED2 each have a switch coupled in series. For the invention to work, it suffices if only one of the LED strings has a switch coupled in series. An additional switch can be introduced in the other LED string to further improve color controllability.

In the examples provided, the first LED string LED1 may have a lower total forward voltage that the second LED string LED1.

To simplify the controls in the situation that each string of LEDs has a switch coupled in series, the switches can be controlled in a complementary way. This means that when one switch is turned on, the other is turned off and vice versa.

This can furthermore be beneficial in the situation that the switched mode power supply 2 is arranged to provide a constant current. The current has with this control method always a current path because there is always one of the switches turned on.

The invention claimed is:

1. A lighting system comprising:
    a load comprising:
        a parallel configuration of:
            a first LED load having a first forward voltage, and a first switch coupled in series with the first LED load; and
            a second LED load, having a second forward voltage being different than the first forward voltage;
    a switched mode power supply comprising:
        a switching element;
        an inductor;
        a diode;
        a set of output pins for coupling to the load; and
        a capacitor coupled across the set of output pins;
        wherein the switched mode power supply is arranged to provide a voltage across the set of output pins,
    a further inductor configured to receive the voltage from the set of output pins and to output a current to both the first and second LED load.

2. The lighting system according to claim 1, wherein the load comprises a second switch coupled in series with the second LED load.

3. The lighting system according to claim 2, wherein the first switch is turned on complementary to the second switch.

4. The lighting system according to claim 1, wherein the lighting system comprises only one switched mode power supply.

5. The lighting system according to claim 1, wherein the first switch is controlled using pulse width modulation.

6. The lighting system according to claim 1, wherein the switched mode power supply is arranged to provide a constant current.

7. The lighting system according to claim 1, wherein the switched mode supply is configured as any one of a buck converter, a boost converter, a buck-boost converter, a flyback converter, an LLC converter, a SEPIC converter and a ćuk converter.

8. The lighting system according to claim 1, wherein the load comprises a third LED load and a third switch coupled in series with the third LED load, wherein the third LED load and the third switch are coupled in parallel with the load.

9. The lighting system according to claim 8, wherein a light color of the first LED load, the second LED load and the third LED load are different to each other.

10. The lighting system according to claim 1, wherein the capacitor is a buffer capacitor for storing energy for driving the load.

11. The lighting system according to claim 1, wherein the first switch comprises an anti-parallel diode.

12. The lighting system according to claim 1, wherein the parallel configuration comprises:
- a first diode coupled in series with the first LED load;
- a second diode coupled in series with the second LED load;
- a first capacitor coupled in parallel with the first LED load; and
- a second capacitor coupled in parallel with the second LED load.

13. The lighting system according to claim 1, wherein a forward voltage of the first LED load is lower than a forward voltage of the second LED load.

* * * * *